UNITED STATES PATENT OFFICE.

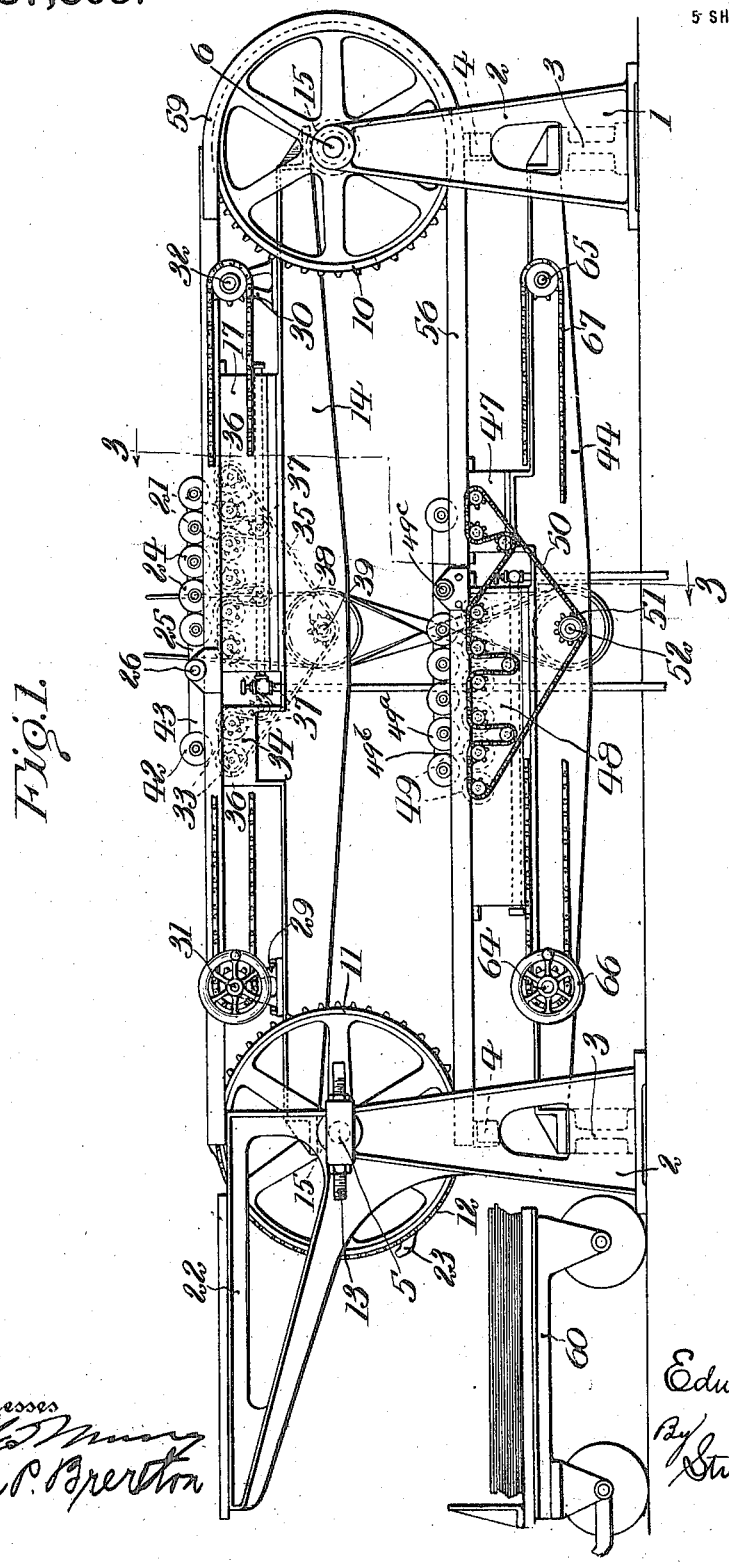

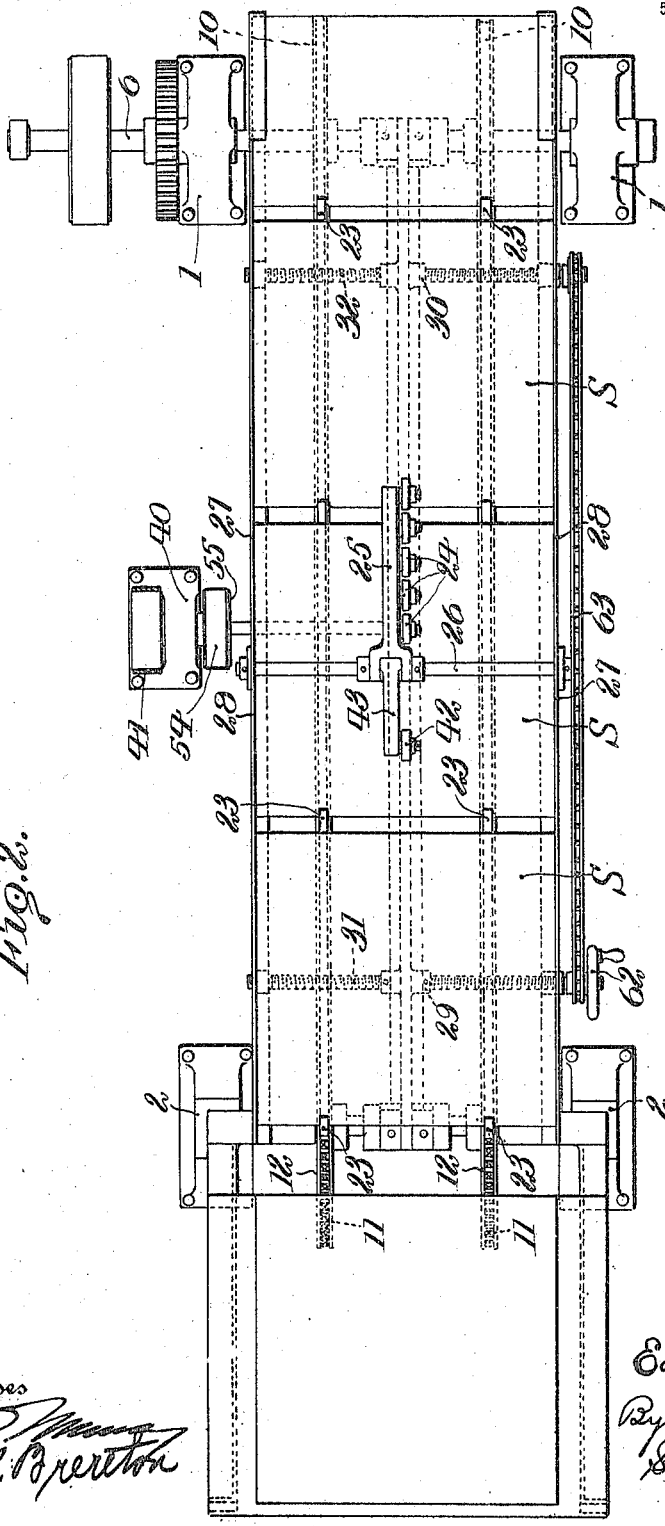

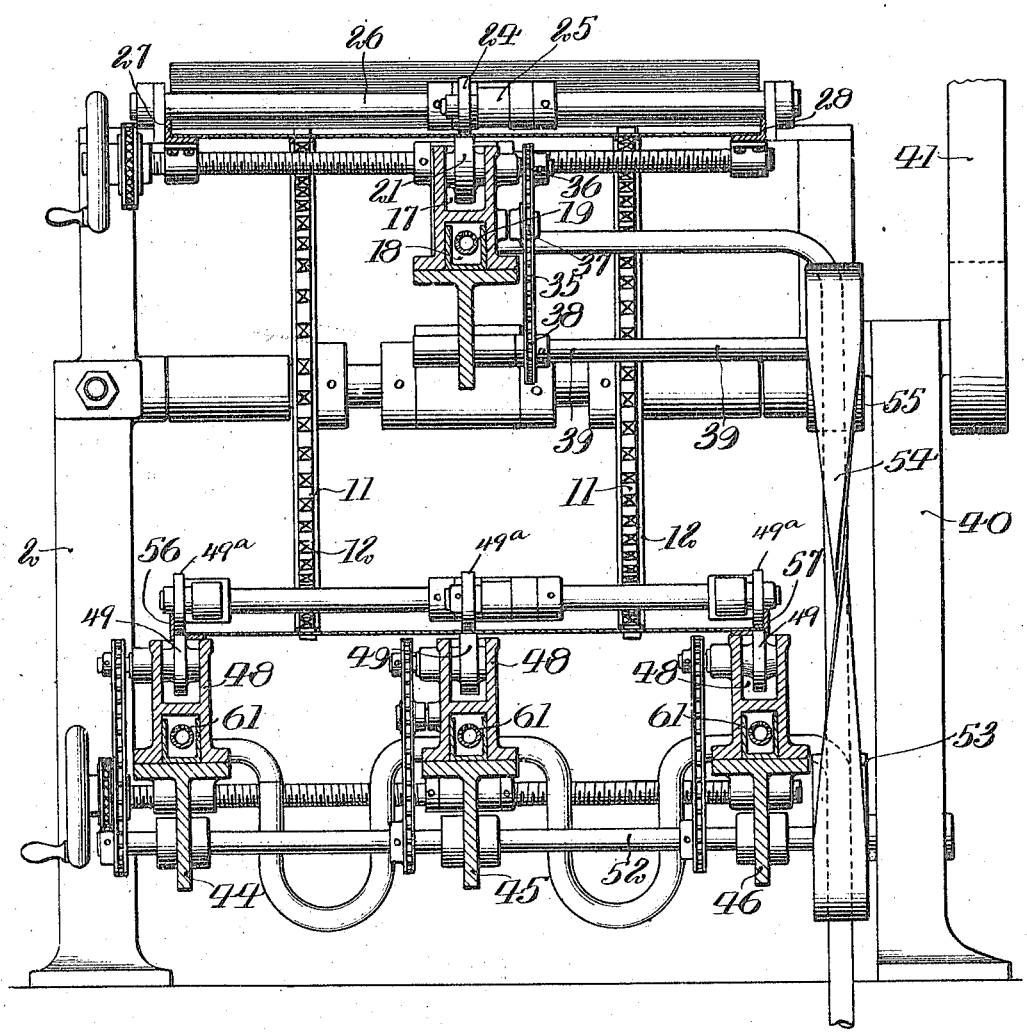

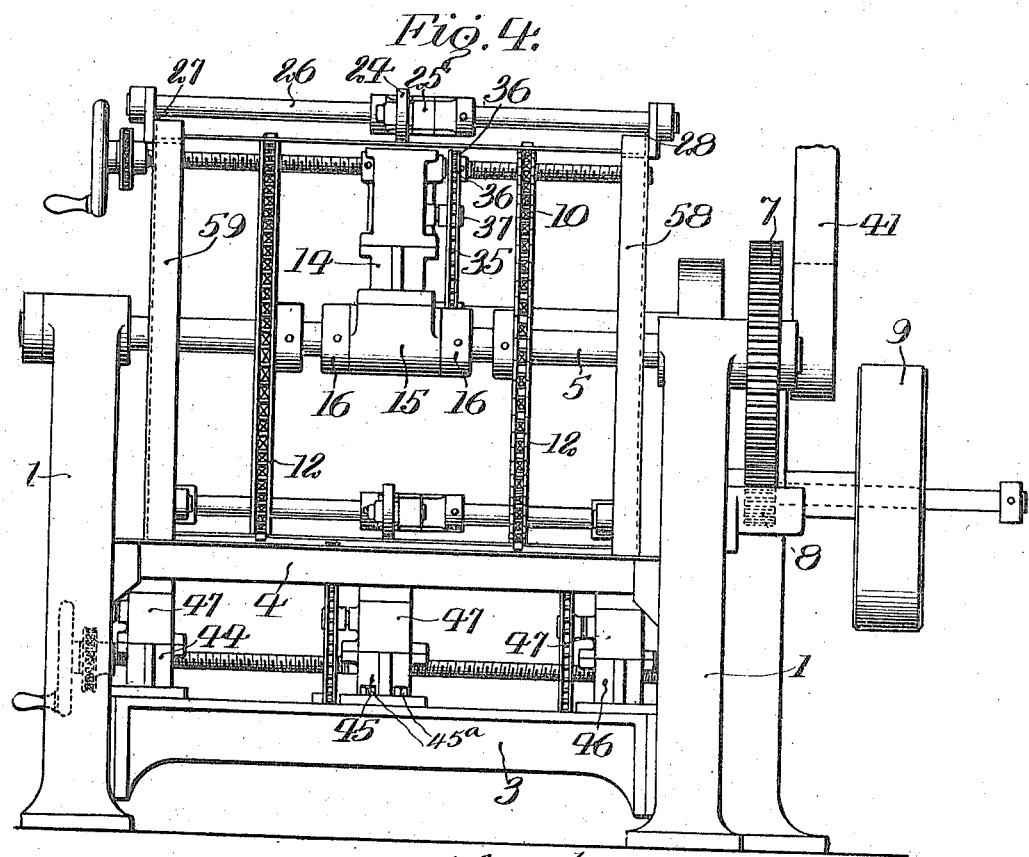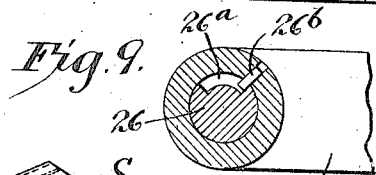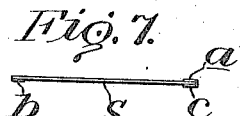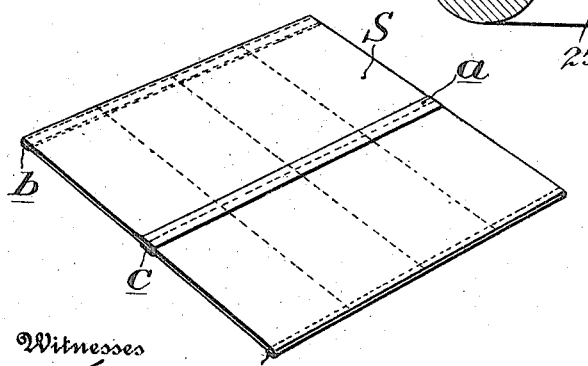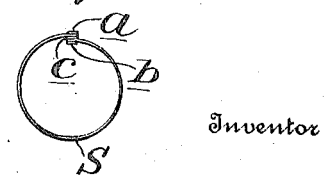

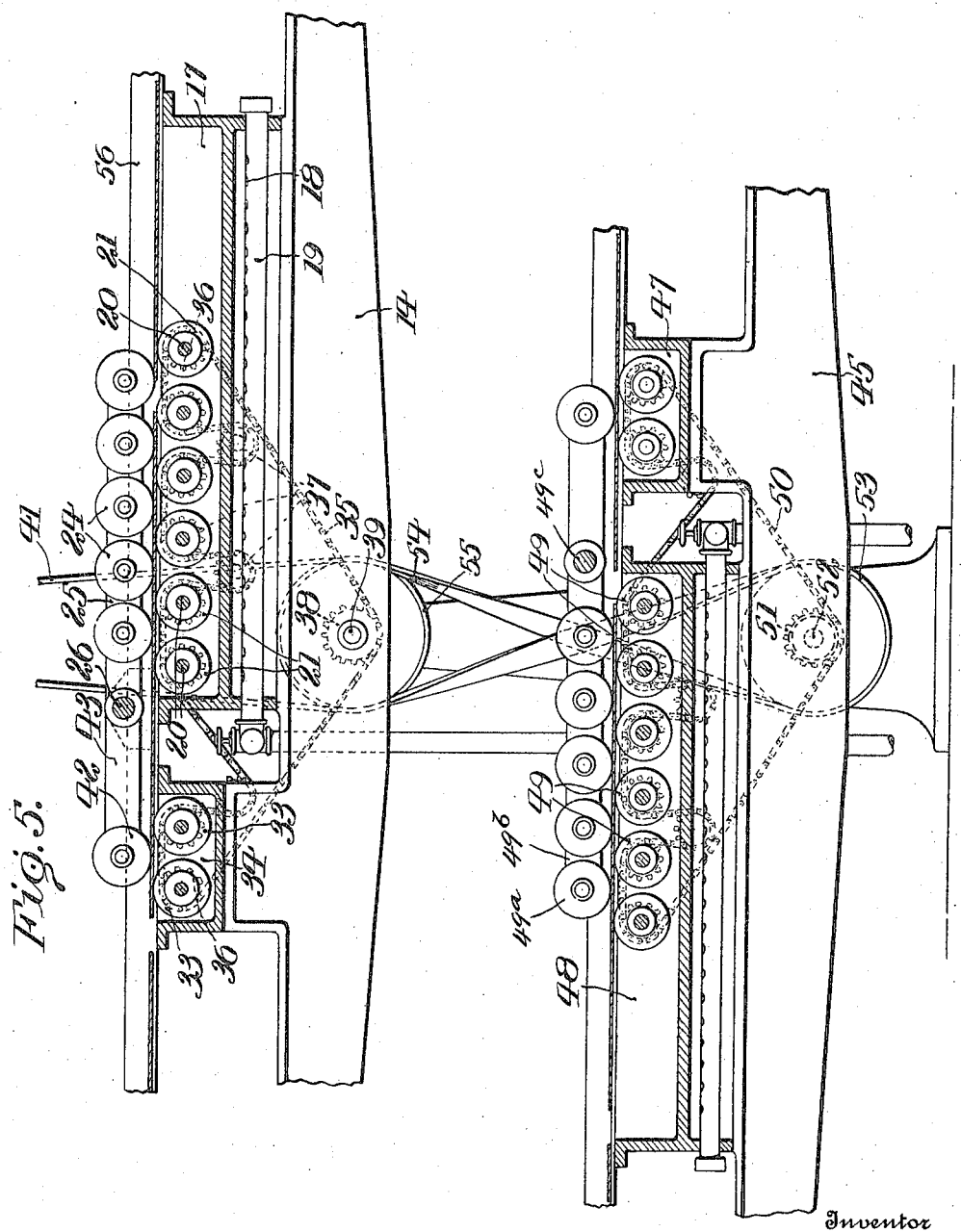

EDWIN NORTON, OF PAGET WEST, BERMUDA; LUCY E. NORTON EXECUTRIX OF SAID EDWIN NORTON, DECEASED.

SOLDER-STRIP-COATING MACHINE.

1,237,805.  Specification of Letters Patent.  Patented Aug. 21, 1917.

Application filed June 19, 1914. Serial No. 846,118.

*To all whom it may concern:*

Be it known that I, EDWIN NORTON, a citizen of the United States, residing at Paget West, Bermuda, have invented certain new and useful Improvements in Solder-Strip-Coating Machines, of which the following is a description, reference being had to the accompanying drawing and to the figures of reference marked thereon.

The invention relates to new and useful improvements in solder applying devices and more particularly to devices for applying solder to metal in sheet form prior to the same being cut into blanks to be utilized in forming can bodies, or the like.

An object of the invention is to provide an apparatus of the above character wherein the sheets may be fed one after another through the apparatus and each sheet provided with a solder strip positioned on the sheet so that when the sheet is cut into suitable shaped blanks and formed into can bodies the solder on the sheet may be utilized for joining the edges of the body blanks.

A further object of the invention is to provide an apparatus of the above character wherein the sheets being coated with a strip of solder may be turned over and coated on each side thereof.

A still further object of the invention is to provide an apparatus of the above character which may be quickly adjusted to adapt the same for sheets of different widths for the making of can bodies of different sizes.

These and other objects will in part be obvious and will in part be hereinafter more fully disclosed.

In the drawings, which show by way of illustration one embodiment of the invention, Figure 1 is a side view of an apparatus embodying my improvements.

Fig. 2 is a plan view of the same.

Fig. 3 is a sectional view on the line 3—3 of Fig. 1.

Fig. 4 is an end view of the machine.

Fig. 5 is an enlarged view showing a longitudinal section through the center part of the machine.

Fig. 6 is a perspective view showing a sheet of metal coated with solder strips.

Fig. 7 shows a blank cut from said sheet,

Fig. 8 shows the blank formed into a can body, and

Fig. 9 is a detail view of the stop for limiting the movements of the arm which supports the pressure rolls.

The invention consists generally in providing a supporting frame on which are mounted suitable traveling carrying devices which take the sheets to be coated one after another and carry the same through the machine. These traveling devices may be in the form of endless chains, or other suitable means may be used. A solder applying device is located beneath the plane of travel of the sheet and this solder applying device is preferably in the form of a solder trough in which are mounted rolls which engage the lower face of the sheet and hand-up the solder from the trough to the sheet. These rolls all travel in the same path on the sheet so that each roll forms a solder coating on the sheet and these coatings of solder build up to form a solder strip.

In advance of the solder applying mechanism is a fluxing device which may be of similar construction to the solder applying devices. Pressure rolls engage the upper face of the sheet and hold the same in contact with the fluxing roll and the solder applying rolls. The machine is preferably so constructed that the sheet travels from one end thereof to the other, where it is turned over or reversed and travels back again to the receiving end of the machine. As the sheet returns to the receiving end of the machine, solder strip applying devices operate to coat or apply solder strips to the under face of the sheet so that as the sheet travels through the machine both sides thereof will be supplied with solder strips.

While the apparatus or machine herein shown and described may be used for various purposes, it is especially adapted for applying solder strips to sheets of metal which are subsequently cut to form body blanks for can bodies. To this end, it is desirable to provide the sheet with a solder strip located centrally thereof and extending from end to end of the sheet. Such a sheet is shown in Fig. 6 of the drawings. The sheet S is provided with a solder strip $a$ centrally thereof on one face. This sheet is also provided with three solder strips $b$, $c$, and $d$, on the other face thereof. The strip $c$ extends longitudinally of the sheet centrally of the sheet, and the strips $b$ and $d$ are located at the outer edges thereof. A sheet thus coated may be cut on the broken lines as indicated in Fig. 6 and will thus form eight body blanks, each of which is indicated at s. When this body blank s is formed into a can body, as shown in Fig. 8, the solder strips a, b, and c are brought together in such a way that they may be utilized for joining the edges of the blank and thus closing the side seam. The cutting of the sheet as above suggested is solely for the purpose of making clear one purpose of the invention.

Referring in detail to the apparatus for applying solder strips to a sheet, said apparatus or machine consists of a main frame which comprises standards 1, 1 and 2, 2. These standards are joined by a connecting I-beam 3. A cross bar 4 extends also between the standards at each end of the machine. A shaft 5 is suitably journaled in the standards 1, 1, while a shaft 6 is journaled at the opposite end of the machine in the standards 2, 2. The shaft 6 carries a gear wheel 7 which meshes with a gear wheel 8 on a countershaft which in turn is driven by a suitable belt wheel 9. Mounted on the shaft 6 is a pair of sprocket wheels 10, 10. Also mounted on the shaft 5 at the other end of the machine is a second pair of sprocket wheels 11, 11. Conveyer chains 12, 12 run over the wheels 10, 10 and 11, 11, respectively. The journal bearing for the shaft 5 may be suitably adjusted in the standards 1, 1 for tightening the chains by means indicated at 13.

Extending from end to end of the machine and located centrally thereof is a supporting beam 14. This beam 14 has a journaled support 15 at each end thereof on the shafts 5 and 6, respectively. The journal support 15 is held from endwise movement on the shaft by collars 16. This beam supports the flux applying devices and also the solder applying devices. The solder applying devices consists of a solder trough 17 which is suitably connected to the beam 14. This solder trough has a heating compartment 18 underneath the same, which may be heated by a suitable gas pipe 19. Located in the solder bath are a series of shafts 20, each of which is provided with a handing-up or coating roll 21. The solder in the solder bath 17 is kept in molten condition and the rolls running in the molten solder become coated with the solder and carry the same up to the sheet.

The sheets to be coated are placed on the endless chains 12, 12 at the receiving end of the machine. At this end of the machine there may be a supporting bracket or table 22 for the stack of sheets. One by one the sheets are laid on the chains which carry spaced clips 23. These clips engage the end of the sheet so that the sheet travels with the chain. These chains carry the sheets over the top of the solder trough 17 so that the solder rolls may contact with the lower face of the sheet. These rolls extend slightly above the top of the solder bath. As a means for holding the sheet firmly in contact with the solder rolls, I have provided pressure rolls 24. These rolls are freely journaled on an arm 25. The arm 25 is in turn journaled on a bar 26 which extends from side to side of the machine and supports said arm. The ends of the bar 26 are journaled so as to slide endwise in side guides 27 and 28. These guides 27 and 28 are in the form of angle bars.

Near each end of the beam 14 I have provided supporting brackets 29 and 30. The bracket 29 carries a shaft 31 which is formed with a right and left hand thread. The guide bars 27 and 28 have threaded nuts attached thereto which coöperate with this threaded shaft 31. In the bracket 30 is a shaft 32 which is likewise threaded and engages threaded nuts at the other end of the guide bars 27 and 28. These guide bars are so disposed relative to the supporting chains 12, 12 that the side edges of the sheet are supported and guided by the guide bars.

Flux is applied to the sheet prior to the engagement of the solder rolls therewith by flux rolls 33. These flux rolls are carried by suitable shafts and rotate in a flux bath 34 which is also mounted on the supporting beam 14. The flux rolls 33 and the solder rolls 20 may be positively driven by a suitable chain 35 which runs over gears 36 carried by each of the shafts or supports for the rolls and also over idle gears 37, as shown in dotted lines in Fig. 5. This chain 35 is driven from a gear 38 carried by a shaft 39 which is journaled in the beam 14. The shaft 39 is also journaled in a side standard 40 and it may be driven by a suitable belt 41. A pressure roll 42 coöperates to hold the sheets in contact with the fluxing rolls 33. This pressure roll 42 is carried by an arm 43 which is pivotally mounted on the supporting bar 26. Suitable stops may be provided for limiting the downward movements of the arms 25 and 43 when there is no sheet in the machine so as to hold these pressure rolls from contacting with the fluxing rolls and solder rolls.

In Fig. 9 of the drawings, I have shown the shaft 26 which is fixed against rotation as formed with a slot 26$^a$. A pin 26$^b$ carried by the arm 25 extends into the slot and striking against the end of the slot serves as a stop for limiting the downward movement of the arm 25. A similar pin and slot construction also serves as a limiting stop for the arm 43.

At the lower part of the machine there are three beams 44, 45 and 46 which extend from end to end of the machine and are supported by I-beams 3. Mounted on each of these longitudinal beams is a fluxing bath and solder bath similar to the ones above described. The fluxing bath is indicated at 47 and in said bath are fluxing rolls carried by shafts which support gears at their outer ends. The solder bath is indicated at 48 and is provided with solder rolls 49 which are mounted on suitable shafts, each of which carries a gear at its outer end. An endless chain 50 runs over the gears for positively driving each of the rolls. This chain 50 coöperates with a sprocket gear 51 on a shaft 52, and the shaft 52 is journaled in the longitudinal beams and also in the standard 40. A belt wheel 53 on the shaft 52 is actuated by a belt 54 from a belt wheel 55 on the shaft 39. At the lower part of the machine there are also angle iron guide rails 56 and 57. These guide rails are supported by the solder bath and rest on cross bars 4.

The guide rails 27 and 57 are joined by a U-shaped guide rail 58, while the guide rails 28 and 56 are joined by a U-shaped guide rail 59. The guide rails 58 and 59 are shaped to conform to the travel of the chains about the sprocket wheels 10. The sheet which is to be carried along by the endless chains 12, 12 will be caused by the guide rails 58 and 59 to follow the travel of the chain, that is reverse their direction of travel and pass back to the receiving end of the machine, and as they reverse their travel, the sheets are turned over. As above noted, there is a bath associated with each beam 44, 45 and 46 and these solder applying devices are disposed so as to apply a strip of solder at the center of the sheet and at each edge of the sheet. The guides 56, 57 are cut away to permit the solder rolls to pass through and contact with the sheet.

From the above description, it will be apparent that the sheets may be stacked on the table 22 and placed one at a time on the traveling chains and as the clips carried by the chains engage the sheet, said sheets will be caused to travel with the chain. The sheet will pass underneath the pressure roll and a line of flux applied to the under face thereof, after which the sheet passes underneath the second set of pressure rolls and a strip of solder will be coated on the under face of the sheet. As the sheet continues its travel following the endless chain, it will be turned over and caused to return to the front end of the machine. This return travel of the sheets presents the same to the three solder strip coating devices which engage the under face of the sheet and form a solder strip at the center of the sheet and at each edge of the sheet. When the sheet reaches the front end of the machine, it may be stacked on a suitable truck, indicated at 60.

The solder baths at the lower part of the machine are similar in construction and have been given like numbers. Each solder bath is heated by a suitable gas pipe 61 which is connected to a suitable source of supply. It will be understood that other means may be utilized for heating the solder bath, if desired.

As shown in the drawings, the machine is adjusted for an extreme width of sheet. It may be desired to coat a sheet which is narrower in width and in order that the machine may be quickly adjusted for this purpose and still maintain the solder strip at the center of the sheet, the upper rails 27 and 28 are mounted on threaded shafts 31 and 32, as above described. The shaft 31 carries a hand wheel 62 and also a sprocket wheel which is connected by a sprocket chain 63 with a sprocket wheel on the shaft 32. The turning of the shaft 31 by the wheel 62 will impart a like rotary movement to the shaft 32 and as these shafts are rotated the guide rails 27 and 28 will be moved an equal distance toward or from the center of the machine.

The supporting beams 44 and 46, as above noted, rest on the I-beams 3. These longitudinal beams are not, however, attached to the I-beams, while the longitudinal beam 45 is bolted to the I-beams 3 by bolts 45$^a$. A shaft 64 is journaled in the beam 45 so as to rotate freely therein but is held from endwise movement in the beam. This shaft is formed with right and left hand threads which engage threaded lugs on the longitudinal beams 45 and 46. A second shaft 65 is likewise mounted in the longitudinal beam 45 and has right and left hand threads engaging threaded lugs on the beams 44 and 46. The shaft 64 is provided with a hand wheel 66 and also with a sprocket chain 67 which runs over a sprocket wheel on the shaft 65. By turning the shaft 64 through the hand wheel 66, the sprocket chain 67 will impart a like rotation to the shaft 65 and this will move the outside solder applying devices toward and from the center solder applying device. The guide rails 56 and 57, as above noted, are supported by the solder baths and will be moved therewith. The outer arms 49$^b$ for supporting the pressure rolls 49$^a$ are freely pivoted on a fixed shaft or supporting rod 49$^c$. These arms are held from endwise movement by suitable adjustable collars so that, when the solder baths are adjusted, the arms may be shifted on their supporting shaft or rod so as to bring the pressure rolls directly above the solder rolls. The roll coöperating with the fluxing rolls is likewise supported by a pivoted arm and may be adjusted in a similar manner. Stops similar to the stops 26$^a$ and 26$^b$ may be provided for these arms. The sprocket wheels located on the shaft 52 are held thereon by suitable set-screws which may be loosened and the sprocket wheels adjusted by hand when the solder baths are shifted. It will thus be seen that I have provided means whereby the machine may be quickly adjusted for coating sheets of different widths and without requiring any attention as to the locating of the solder strip in the center of the sheet as these adjustments are equal on each side of the center plane of the machine and the adjusting means itself determines the proper positioning of the parts adjusted.

While I have described in detail an organized mechanism for coating sheets, it will be understood that my invention is not embodied in the detail mechanism disclosed but consists broadly in the arrangement and operation of solder applying devices and conveying means for presenting the sheets thereto whereby the sheets may be coated with a strip of solder first on one face and then on the other, which solder strips are disposed in a certain predetermined relation to the sheet.

It is obvious, therefore, that other devices and forms of apparatus may be utilized for carrying out the invention without departing from the spirit of the invention as set forth in the appended claims.

Having thus described my invention, what I claim as new and desire to secure by Letters Patent is:—

1. A solder strip coating machine including in combination a traveling support for the sheets, mechanism for applying a strip of solder to the under face of the sheet as it passes through the machine, means for reversing the sheet and mechanism for applying a strip of solder to the opposite side of the sheet.

2. A solder strip coating machine including in combination a traveling support for the sheets to be coated, mechanism for applying a strip of solder to the under face of the sheet centrally thereof, means for reversing the sheet and mechanism for applying a strip of solder to the opposite face of the sheet centrally thereof and at the edges of the sheet.

3. A solder strip coating machine including in combination a traveling support for conveying the sheet through the machine for reversing the sheet and returning the same through the machine, solder applying mechanism for applying a strip of solder to the under face of the sheet as it passes through the machine in one direction and mechanism for applying a strip of solder to the other face of the sheet on its return movement through the machine.

4. A solder coating machine including in combination an endless conveyer for supporting the sheets and carrying the same through the machine, reversing the sheets and returning the same through the machine, solder applying devices including spaced solder rolls for applying a strip of solder centrally of the sheet and solder applying mechanism operating upon the sheet in its return movement through the machine for applying a single strip of solder to the sheet centrally thereof, and a strip at each edge of the sheet on the face of the sheet opposite to the first applied coating strips.

In testimony whereof, I affix my signature, in the presence of two witnesses.

EDWIN NORTON.

Witnesses:
 LUCY E. NORTON,
 H. D. MCMILLAN.

Copies of this patent may be obtained for five cents each, by addressing the "Commissioner of Patents, Washington, D. C."